US008629659B2

(12) United States Patent
Johnson

(10) Patent No.: US 8,629,659 B2
(45) Date of Patent: Jan. 14, 2014

(54) THYRISTOR GATE PULSES IN STATIC VAR COMPENSATOR

(75) Inventor: Lynn Johnson, Verona, WI (US)

(73) Assignee: American Superconductor Corporation, Devens, MA (US)

(*) Notice: Subject to any disclaimer, the term of this patent is extended or adjusted under 35 U.S.C. 154(b) by 347 days.

(21) Appl. No.: 12/983,957

(22) Filed: Jan. 4, 2011

(65) Prior Publication Data

US 2012/0169301 A1    Jul. 5, 2012

(51) Int. Cl.
    G05F 1/70 (2006.01)
(52) U.S. Cl.
    USPC .......................................... 323/210; 323/211
(58) Field of Classification Search
    USPC ........ 323/256, 258, 5; 361/56, 100, 111, 103, 361/118, 128; 307/100, 102; 363/21.12, 363/21.13, 39, 52, 57, 56.04, 65
    See application file for complete search history.

(56) References Cited

U.S. PATENT DOCUMENTS

| 4,274,135 | A  | * | 6/1981 | Rosa et al. | ...................... 363/68 |
| 5,202,583 | A  | * | 4/1993 | Larsen et al. | ................. 307/102 |
| 5,402,058 | A  | * | 3/1995 | Larsen | .......................... 323/211 |
| 5,434,497 | A  | * | 7/1995 | Larsen | .......................... 323/209 |
| 7,091,703 | B2 | * | 8/2006 | Folts et al. | ..................... 323/207 |

* cited by examiner

Primary Examiner — Rajnikant Patel
(74) Attorney, Agent, or Firm — Occhiuti & Rohlicek LLP

(57) ABSTRACT

A method of controlling a static VAR compensator includes providing a static VAR compensator having a capacitive component and a thyristor for switching the capacitive component into and out of a power distribution network; monitoring an electrical characteristic associated with the capacitive component; and controlling operation of the thyristor at least in part on the basis of the electrical characteristic associated with the capacitive component.

14 Claims, 2 Drawing Sheets

THYRISTOR GATE PULSES IN STATIC VAR COMPENSATOR

FIELD OF INVENTION

This invention relates to electrical power distribution, and in particular, to controlling the complex power vectors in a power transmission system.

BACKGROUND

The waveform that exists at all points in a power transmission system is ideally a sinusoid of constant frequency. In the US, that frequency is 60 Hz. However, in many parts of the world, the frequency is 50 Hz.

The power transmitted by a power transmission and distribution system is represented by a power vector in the complex plane. The imaginary component of the power vector represents reactive power, while the real component represents the power that actually carries out useful work. The ratio between the real component of the power vector and the magnitude of the power vector is referred to as a "power factor."

The relative magnitudes of the real and reactive power depend on system loads. These system loads, which can change from time to time, affect a phase relationship between the voltage and current waveform on the transmission line. This phase relationship depends on the imaginary part of the impedance (i.e. the reactance) seen by the transmission line. As these loads increase, the transmission and/or distribution line voltages can change from their desired levels.

In response to changes in the load, one can provide or withdraw reactive VARs to control the voltage level on the network. One known device for carrying out this function is a static VAR compensator. These static VAR compensators use high-voltage thyristors to connect and disconnect a reactive capacitor from the line. The control of these thyristors is critical to avoid damaging them.

The control of the thyristors depends in part on the voltage waveform present on the line. This voltage waveform is subject to electrical disturbances. In some cases, these electrical disturbances are dominated by harmonic content that is, to some extent, predictable. When this is the case, techniques such as that described in U.S. patent application Ser. No. 12/749,390, filed on Mar. 30, 2010 and incorporated herein by reference, can be used to determine when gate current can safely be turned off, and when it should be applied. However, when the electrical disturbances occur at random, the techniques disclosed in the foregoing patent application are less effective.

SUMMARY

In one aspect, the invention features a method of controlling a static VAR compensator. Such a method includes providing a static VAR compensator having a capacitive component and a thyristor for switching the capacitive component into and out of a power distribution network; monitoring an electrical characteristic associated with the capacitive component; and controlling operation of the thyristor at least in part on the basis of the electrical characteristic associated with the capacitive component.

In some practices of the invention, the electrical characteristic is a voltage across the capacitive component. Among these practices are those that also include obtaining an estimate of a time rate of change, the time rate of change being a rate of change of the voltage waveform with respect to time. In such cases, controlling operation of the thyristor includes applying a current to a gate of the thyristor based at least in part on a relationship between the estimate and a safety threshold. In yet others of these practices, controlling operation of the thyristor includes controlling operation at least in part based on the estimate.

Some additional practices of the invention also include obtaining an estimate of a derivative of the time rate of change. In these practices, controlling operation of the thyristor includes controlling operation of the thyristor at least in part on the basis of the estimate of the second derivative.

Alternative practices include those in which controlling operation of the thyristor includes applying a gate current to the thyristor when the estimate of the time rate of change reaches a first designated value, as well as those in which controlling operation of the thyristor includes ceasing application of a gate current to the thyristor when the estimate of the time rate of change reaches a second designated value.

In yet other practices, controlling operation of the thyristor includes applying a gate current to the thyristor when the estimate of the time rate of change reaches a first designated value, and ceasing application of the gate current when the estimate of the time rate of change next reaches the designated value.

In another aspect, the invention features an apparatus for static VAR compensation in a power distribution network. Such an apparatus includes a capacitive load; a thyristor for causing the reactive load to be switched into and out the power distribution network; a current source for applying a gate current to the thyristor; and a controller for causing gate current to be applied and removed on the basis of an estimate of a time rate of change, the time rate of change being a rate of change of a voltage across the capacitive load.

Some embodiments also include a digital signal processing circuit for providing the estimate of the time rate of change based on a signal representative of a voltage across the capacitive load. In other embodiments, an analog circuit provides the estimate of the time rate of change based on a signal representative of a voltage across the capacitive load.

In another aspect, the invention features an apparatus for static VAR compensator in a power distribution network. Such an apparatus includes a capacitive load; a thyristor for causing the reactive load to be switched into and out the power distribution network; means for applying a gate current to the thyristor; and means for causing gate current to be applied and removed at least in part on the basis of an estimate of a time rate of change, the time rate of change being a rate of change of a voltage across the capacitive load.

Among the embodiments are those that also include means for estimating the time rate of change, and those in which the means for causing gate current to be applied and removed further includes means for measuring a second derivative, the second derivative being a rate of change of the time rate of change.

These and other features of the invention will be apparent from the following detailed description and the accompanying figures, in which:

DETAILED DESCRIPTION

Figure 1:
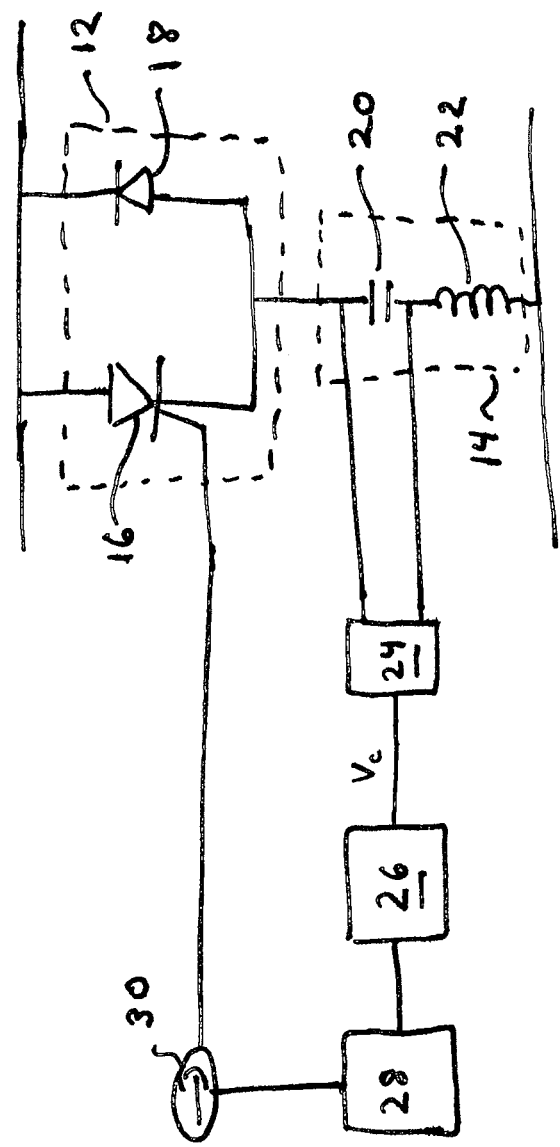
FIG. 1 shows a static VAR compensator with a thyristor-switched capacitor.

A typical static VAR compensator 10, shown in FIG. 1, brings the power factor to unity or brings the voltage between first and second lines 11a, 11b to a desired level by controlling the reactance presented to a power transmission system. Alternatively, a typical static VAR compensator can correct for fast voltage dips and/or flicker. The second line 11b is typically a transmission line. The first line 11a is either a neutral line or another transmission line at another voltage.

The static VAR compensator 10 shown in FIG. 1 includes a valve 12 in series with a reactive element 14. The valve 12 includes a thyristor 16 in parallel with a diode 18 of opposite polarity. In operation, the valve 12 selectively switches the reactive element 14 in and out. Within the reactive element 14, a capacitor 20 provides a primary impedance and a detuning inductive reactor 22, which provides a secondary impedance. The polarity of the static VAR compensator 10 shown in FIG. 1 can be reversed without changing the principles of its operation.

The thyristor 16 has three terminals: a gate 23a, a cathode 23b, and an anode 23c. Applying a gate current to the thyristor's gate terminal 23a causes a conducting path for thyristor-current between the thyristor's cathode 23b and the anode 23c. This conducting path continues to exist even when the gate current is turned off. As a result, the thyristor 16 latches into a conducting state. Once latched in the conductive state, the thyristor provides a conductive path for the thyristor-current without the need to continuously provide gate current.

As a result of the conducting path, a thyristor-current begins to flow between cathode 23b and anode 23c of the thyristor 16. This connects the reactive element 14 to the power transmission system and thereby alters the impedance presented to the system. When the correct reactance is switched into the circuit at the correct time, the power vector rotates toward the positive real axis, thus bringing the power factor closer to unity or the line voltage to a desired level. Alternatively, switching the correct reactance into the circuit at the correct time reduces the voltage dip and/or flicker.

The thyristor 16 maintains the conducting path between anode 23c and cathode 23b for as long as the thyristor-current remains above a quenching threshold. This quenching threshold is slightly above zero amps, but for most practical purposes, is treated as zero amps. If the thyristor-current falls below this quenching threshold, the conducting path between anode 23c and cathode 23b disappears. The disappearance of this conducting path in turn disconnects the reactive element 14 from the circuit.

As the conducting path disappears, charge carriers (i.e. holes and electrons) still present within the thyristor 16 recombine. The recombination process takes some time to complete. The period during which this recombination takes place is called the "refractory period." After the refractory period, it becomes safe to turn the thyristor 16 on again.

During the refractory period, the thyristor 16 is particularly vulnerable to damage. If, during the refractory period, the thyristor-current were to somehow rise back above the quenching threshold, even momentarily, the thyristor could be damaged when no gate current has been applied. This spontaneous and uncontrolled re-opening of the conducting path between the thyristor's anode 23c and cathode 23b can result in serious physical damage to the thyristor 16.

In operation, one would apply a gate current whenever there is a risk that the thyristor-current will fall below the quenching threshold. Doing so reduces the likelihood of damaging the thyristor during a refractory period.

A difficulty that arises, however, is that it is sometimes difficult to know exactly when the thyristor current will fall below the quenching threshold. In general, the current waveform is not a perfect sinusoid. Instead, the current waveform often includes various disturbances superimposed on it. These disturbances can include harmonic content, which lends itself to some predictably. However, the disturbances can also include randomly occurring current drops that cannot readily be predicted.

As noted above, if thyristor-current momentarily rises above the quenching threshold during a refractory period, the thyristor 16 may sustain serious damage. Consequently, it is preferable to make sure a gate current is present whenever the thyristor-current is near the quenching threshold. This reduces the risk of the thyristor-current momentarily rising above the quenching threshold in the absence of any gate current.

Known methods of controlling the timing of the gate current rely, to a great extent, on an educated guess based on what disturbances can be expected in the thyristor-current. Thus, using these known methods, it is possible that an unanticipated disturbance will unexpectedly drive the thyristor-current below the quenching threshold while no gate current is present. This can result in the conducting path spontaneously re-opening during the refractory period.

An alternative approach, which avoids the foregoing difficulties, is to observe a time rate of change of voltage across the capacitor 20. When this time rate of change falls below a predefined safety threshold, one applies a gate pulse since the capacitor and thyristor currents would then be near zero.

In FIG. 1, a voltage measuring element 24 provides a measurement of capacitor voltage to a digital signal processor 26, which then calculates a time rate of change of the capacitor voltage and provides the result to a controller 28. The controller 28 uses that result to determine when to drive a current source 30 that is connected to the gate terminal 23a of the thyristor 16.

In some embodiments, the controller 28 determines that that the time rate of change of the capacitor voltage is less than some predefined safety threshold and adaptively controls when the gate pulse should occur. In other embodiments, the digital signal processor 39 also calculates a second derivative. This second derivative is then provided to the controller 28, which then uses it to determine whether the capacitor voltage, even if close to zero, is moving away or towards zero. If the former is the case, the controller 28 does not apply a gate pulse, whereas if the latter is the case, the controller 28 applies a gate pulse. In either case, the controller 28 maintains the gate pulse until the time rate of change of the capacitor voltage rises beyond some safety threshold.

The value of the safety threshold will vary from one installation to another, and will depend to some extent on how quickly a gate pulse can be applied. For example, if the safety threshold is too low, by the time the controller 28 can apply a gate pulse, it may be too late and damage to the thyristor 16 may have occurred. If the safety threshold is too high, the controller 28 will apply a gate pulse prematurely, thus wasting energy.

Figure 2:
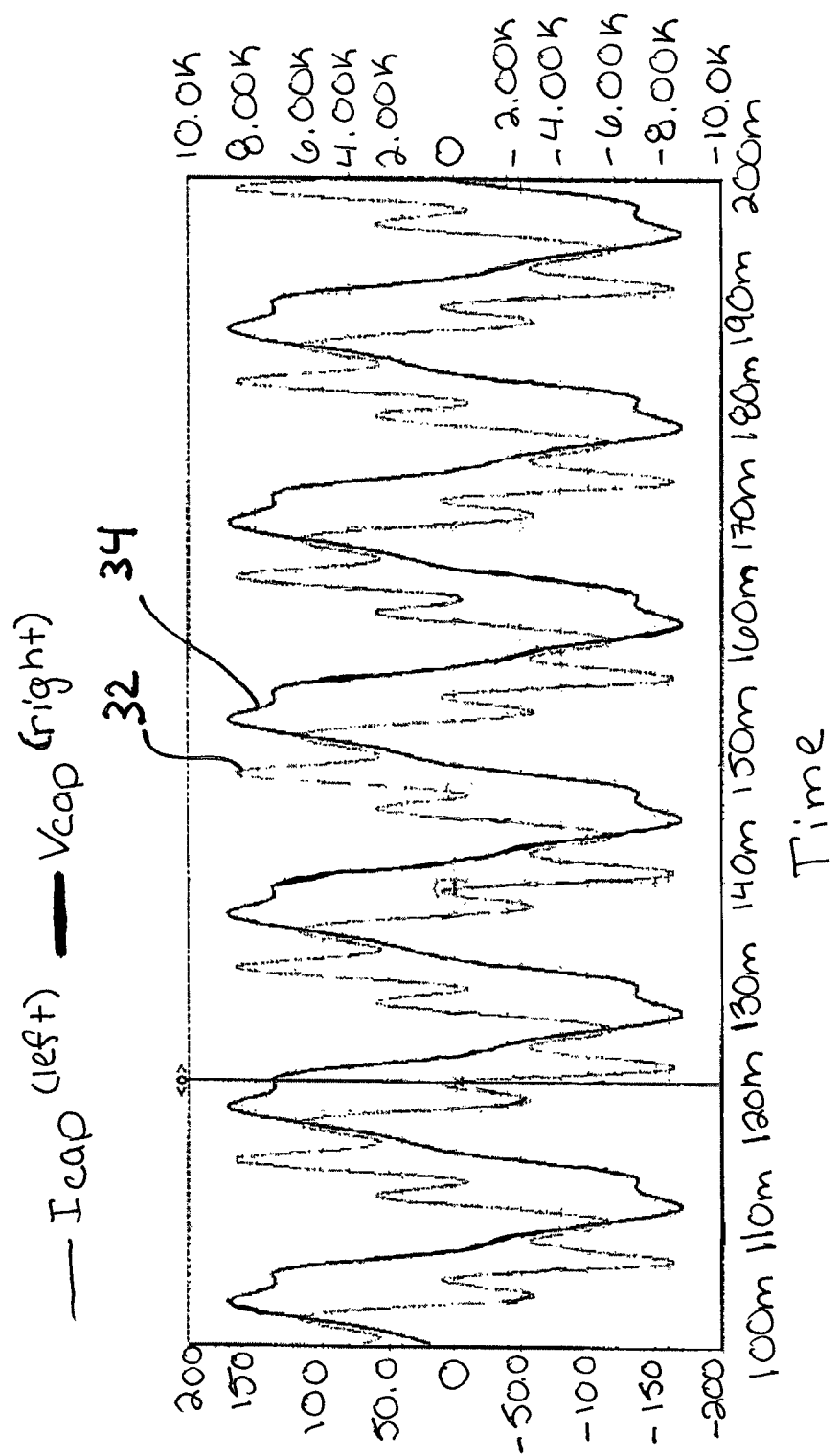
FIG. 2 compares a thyristor-current waveform and a voltage across a capacitor.

FIG. 2 shows a typical thyristor-current 32 and the accompanying a capacitor voltage 34 measured across the capacitor 20. It is apparent from the figure that the thyristor-current 32 goes to zero when the time rate of change of capacitor voltage 34 goes to zero. It is also apparent that the thyristor current 32 approaches zero whenever the second derivative of the capacitor voltage 34 is negative.

While the foregoing discussion has referred to "current waveform," it will be apparent that current waveform is related to other electrical waveforms, such as voltage and power waveforms, and that the methods described herein can readily be adapted to such waveforms by minor modifications.

In other embodiments, the digital signal processor 26 is replaced by an analog circuit. For example, an analog circuit could have a differentiator circuit connected to the voltage across the capacitor 20. The output of the differentiator circuit is then provided to a comparator circuit for comparing the resulting time rate of change of capacitor voltage with a safety threshold. Such an analog circuit could be extended to measure a second derivative by placing another differentiator circuit in series with the first differentiator circuit and using the output of that other differentiator circuit as a basis for estimating a second derivative.

Having described the invention, and a preferred embodiment thereof, what I claim as new and secured by letters patent is:

1. A method of controlling a static VAR compensator, said method comprising: providing a static VAR compensator having a capacitive component and a thyristor for switching said capacitive component into and out of a power distribution network; monitoring an electrical characteristic associated with said capacitive component; and controlling operation of said thyristor at least in part on the basis of a time rate of change of said electrical characteristic associated with said capacitive component.

2. The method of claim 1, wherein said electrical characteristic is a voltage across said capacitive component.

3. The method of claim 2, further comprising obtaining an estimate of a time rate of change, said time rate of change being a rate of change of said voltage waveform with respect to time, and wherein controlling operation of said thyristor comprises applying a current to a gate of said thyristor based at least in part on a relationship between said estimate and a safety threshold.

4. The method of claim 3, wherein controlling operation of said thyristor comprises controlling operation at least in part based on said estimate.

5. The method of claim 3, further comprising obtaining an estimate of a derivative of said time rate of change, and wherein controlling operation of said thyristor comprises controlling operation of said thyristor at least in part on the basis of said estimate of said second derivative.

6. The method of claim 1, wherein controlling operation of said thyristor comprises applying a gate current to said thyristor when said estimate of said time rate of change reaches a first designated value.

7. The method of claim 1, wherein controlling operation of said thyristor comprises ceasing application of a gate current to said thyristor when said estimate of said time rate of change reaches a second designated value.

8. The method of claim 1, wherein controlling operation of said thyristor comprises applying a gate current to said thyristor when said estimate of said time rate of change reaches a first designated value, and ceasing application of said gate current when said estimate of said time rate of change next reaches said designated value.

9. An apparatus for static VAR compensator in a power distribution network, said apparatus comprising: a capacitive load; a thyristor for causing said capacitive load to be switched into and out said power distribution network; a current source for applying a gate current to said thyristor; and a controller for causing gate current to be applied and removed on the basis of an estimate of a time rate of change, said time rate of change being a rate of change of a voltage across said capacitive load.

10. The apparatus of claim 9, further comprising a digital signal processing circuit for providing said estimate of said time rate of change based on a signal representative of a voltage across said capacitive load.

11. The apparatus of claim 9, further comprising an analog circuit for providing said estimate of said time rate of change based on a signal representative of a voltage across said capacitive load.

12. An apparatus for static VAR compensator in a power distribution network, said apparatus comprising: a capacitive load; a thyristor for causing said capacitive load to be switched into and out said power distribution network; means for applying a gate current to said thyristor; and means for causing gate current to be applied and removed at least in part on the basis of an estimate of a time rate of change, said time rate of change being a rate of change of a voltage across said capacitive load.

13. The apparatus of claim 12, further comprising means for estimating said time rate of change.

14. The apparatus of claim 12, wherein said means for causing gate current to be applied and removed further comprises means for measuring a second derivative, said second derivative being a rate of change of said time rate of change.

* * * * *